United States Patent
Cox et al.

(10) Patent No.: US 9,623,986 B2
(45) Date of Patent: Apr. 18, 2017

(54) AIRCRAFT PASSENGER BOARDING SYSTEM

(71) Applicant: Borealis Technical Limited, North Plains, OR (US)

(72) Inventors: Joseph J. Cox, Portland, OR (US); Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 14/614,390

(22) Filed: Feb. 4, 2015

(65) Prior Publication Data
US 2015/0298823 A1     Oct. 22, 2015

Related U.S. Application Data

(60) Provisional application No. 61/935,828, filed on Feb. 4, 2014.

(51) Int. Cl.
*B64F 1/305* (2006.01)
*B64F 1/30* (2006.01)

(52) U.S. Cl.
CPC .............. *B64F 1/305* (2013.01); *B64F 1/30* (2013.01)

(58) Field of Classification Search
CPC .................................. B64F 1/305; B64F 1/30
USPC ........ 14/69.5, 70–71.3, 71.7, 72.5, 77.1, 78; 187/201; 104/229, 165, 241, 288
See application file for complete search history.

(56) References Cited

U.S. PATENT DOCUMENTS

| | | |
|---|---|---|
| 6,657,334 B1 | 12/2003 | Edelson |
| 7,116,019 B2 | 10/2006 | Edelson |
| 7,469,858 B2 | 12/2008 | Edelson |
| 2006/0273686 A1 | 12/2006 | Edelson et al. |
| 2012/0211606 A1* | 8/2012 | Cornell ................... B61B 1/005 244/137.2 |
| 2013/0041855 A1 | 2/2013 | Scruggs et al. |
| 2013/0068890 A1* | 3/2013 | Boren ................... B64D 11/00 244/137.2 |

OTHER PUBLICATIONS

The Flying Carpet Express Boarding, www.the-flying-carpet.com.
Hiltzik, "Another Reason to avoid United Airlines: Its dopey boarding procedure," Los Angeles Times, Nov. 18, 2013.

* cited by examiner

*Primary Examiner* — Basil T Jos

(57) ABSTRACT

An aircraft passenger boarding system is provided for aircraft equipped for pilot-controllable engines-off taxi that enables a pilot to drive the aircraft without engines in a forward direction into and out of an optimum parallel or angled gate parking orientation that permits terminal connections to both forward and aft doors on a terminal-facing side of the aircraft. Selected defined classes of passengers board the aircraft separately, through a designated loading bridge connected to a forward door or through a designated loading bridge connected to an aft door, to be seated in a designated front or rear aircraft section. An airline may flexibly allocate variably sized sections of the aircraft interior for each defined class, depending on the relative numbers of passengers in each class. Airport terminal interior gate space may be used to separate passenger classes as required for separate boarding through a forward door or an aft door.

16 Claims, 2 Drawing Sheets

AIRCRAFT PASSENGER BOARDING SYSTEM

PRIORITY CLAIM

This application claims priority from U.S. Provisional Application No. 61/935,828, filed 4 Feb. 2014, the disclosure of which is fully incorporated herein.

TECHNICAL FIELD

The present invention relates generally to systems and methods for boarding passengers on commercial aircraft and specifically to a system for boarding passengers on a commercial aircraft parked at an airport gate or parking location in an orientation that enables full access to aircraft front and rear doors for passenger boarding.

BACKGROUND OF THE INVENTION

Airlines have experienced challenges with boarding passengers since commercial aircraft have been able to carry more than a very small number of passengers. The expansion of commercial passenger aviation to include more aircraft, more scheduled flights, and distinctions between classes of passengers on these flights has resulted in a situation in which more time is spent boarding passengers than on other aircraft ground operations. Getting passengers to assigned seats and carry-on baggage to available spaces in overhead bins commonly slows aircraft departures. Slowed aircraft turnarounds may be not only frustrating to passengers, but also potentially costly to airlines.

Most departing aircraft at large international airports are connected at one end to a terminal building by a passenger loading bridge or jet bridge that connects at an opposite end to an aircraft door in a forward section of the aircraft. At smaller airports and even at larger airports in many countries, an aircraft's forward access stairs or portable stairs may be used for passenger boarding through the aircraft's forward entry door. Generally, only one passenger at a time can pass through the door, creating an initial bottleneck. The systems currently used by airlines to board passengers, moreover, create additional bottlenecks that may significantly increase the time between when a passenger first enters the aircraft door and when the last passenger is seated.

Much effort has been expended reviewing and analyzing aircraft passenger boarding systems. Boarding systems have been subjected to mathematical analysis, computer modeling, and other analytic processes, and many proposed solutions require a level of passenger regimentation that is admitted to be likely to be resisted by most passengers. Airlines long ago instituted various passenger-pleasing preference policies that ensure preferential treatment of passengers who pay higher fares and/or fly frequently and regularly on an airline. These passengers are typically seated first in the front section of an aircraft closest to the entry door in wide seats, or even beds on long international flights, while the rest of the passengers maneuver past them on their way to the less desirable and less costly seats behind this section. Since about 2008, when most of the larger airlines began to charge fees for checked baggage, the procession of passengers maneuvering down aircraft aisles has also included a large quantity of carry-on baggage, most often in the form of a rolling case, that must be stowed in overhead bins or below seats in front of the passengers. Passengers looking for available overhead bin space that will accommodate carry-on bags near assigned seats may create additional bottlenecks that delay the boarding process.

The boarding process used by most airlines assigns specific seats to passengers and then boards passengers in a designated order. Preferred passengers are boarded and seated first, then families with small children and/or those needing assistance, although this order may be reversed. Everyone else, the group that includes the largest number of passengers, is boarded after the first two groups have been called. Of this group, passengers assigned seats in the rear of the aircraft are typically directed to board first, and the remaining passengers are directed to board in order from the rear toward the front. If a passenger assigned to a window seat arrives after those in the row assigned to middle or aisle seats are seated, the seated passengers may have to get out of their seats to let the newly arrived passenger reach the seat, creating yet another bottleneck. A passenger boarding process designed to eliminate this particular bottleneck has been adopted by United Airlines. The system used by United, demonstrated by computer models to be faster than the rear to front system just described, has been named "WilMA," for window-middle-aisle. After first class and other preferred passengers are boarded, the remaining passengers assigned to window seat are boarded first, then those in middle seats, then those in aisle seats. Passengers have objected to this system, however, since family members who selected seats together in a row are separated by the boarding process, leaving children unaccompanied by an adult waiting to board. In addition, finding an available overhead bin for carry-on baggage has been found to be more challenging with this system. The passenger boarding system used by Southwest Airlines does not assign specific seats to passengers, but directs passengers to board in the order in which they check in, with the possibility of earlier boarding with the payment of a fee. Passengers choose seats and stow bags after boarding, which has led to a quicker boarding process and less delay than the other systems described. At least one airline currently charges an additional fee for carry-on bags, which has been reported to reduce both the number of these bags and the delays caused by passengers trying to put them in overhead bin space. Whether this approach is likely to be adopted by more airlines or favorably received by passengers who carry their bags onboard to avoid checked baggage charges is debatable.

Congestion inside an airport terminal gate prior to boarding may often be an issue that presents challenges to airline gate personnel trying to check in and board passengers. Systems for passenger boarding that organize passengers in a boarding order inside an airport terminal prior to actual boarding of an aircraft have been proposed. In U.S. Patent Application Publication No. US2013/0041855, for example, Scruggs et al describes a time saving method of boarding passengers onto aircraft and other vehicles in which seats in a gate waiting area are arranged in rows that correspond to the number of seats on an aircraft to be boarded. Passengers are directed to their assigned seat in the waiting area, and carry-on bags are placed in bins located adjacent to the seats while pre-flight instructions usually given onboard the aircraft are given while passengers wait to board. Actual aircraft boarding is carried out in a rear to front process as described above, and passengers still must stow their carry-on bags after boarding the aircraft, unless these bags have been determined too large to fit and were checked at the gate. Most interior gate areas at airports lack the floor space required to replicate the interior seating of the commercial aircraft likely to be using the gate, however. Expanding interior gate area to set up the system described by Scruggs et al is highly likely to require expansion of an airport terminal, which is not an option at most airports. The Scruggs et al system contemplates using middle and rear vehicle doors in addition to a front door for boarding, but it is not suggested that boarding could be other than in a rear to front order.

An airline passenger boarding system called the "flying carpet", described at the-flying-carpet.com, provides a carpet that is a scaled down replica of an aircraft seating plan and accommodates about 30 people at a time. Passengers stand on a carpet area that corresponds to their seat. When there is no more room, this group of passengers is boarded, and another group of passengers can find their seats on the carpet. Boarding of each group of passengers is conducted from rear to front as in systems described above; the difference is that the passengers are likely to be scattered throughout the aircraft. While this interior gate system does not take up the space of the Scruggs et al system, it does not eliminate delays caused by window or middle seat passengers arriving after aisle seat passengers. Since this system appears to use a first to stand on the seat space is the first to board approach, passengers anxious to board early are likely to jockey with other passengers for space on the carpet, which could make crowd control in the gate area interesting.

None of the passenger boarding systems proposed by the airline industry or the prior art completely addresses all of the challenges with boarding a large number of people and a large number of carry-on bags on an aircraft with limited passenger access and space for passenger movement or that eliminates, or at least reduces, the main passenger boarding bottlenecks that delay an aircraft's departure. With the exception of the Scruggs et al system, which presents the disadvantages discussed above, a flexible passenger boarding system that fully utilizes multiple passenger entry doors on an aircraft to optimize passenger boarding has not been suggested.

SUMMARY OF THE INVENTION

It is a primary object of the present invention, therefore, to overcome the deficiencies of the prior art and to provide an aircraft passenger boarding system that fully utilizes multiple passenger entry doors on an aircraft to optimize passenger boarding.

It is another object of the present invention to provide an aircraft passenger boarding system that takes advantage of improvements in aircraft ground travel and gate operations in aircraft equipped with non-engine drive means that enable parking an aircraft in orientations which permit direct connection of at least forward and aft aircraft doors on a terminal side of an aircraft to an interior terminal gate area for passenger access to the aircraft.

It is an additional object of the present invention to provide an aircraft passenger boarding system that provides an airline with the flexibility to apportion interior seating areas to accommodate varying numbers of preferential treatment passengers and varying numbers of economy passengers and to board preferential and economy interior areas from different aircraft doors.

It is a further object of the present invention to provide an aircraft passenger boarding system that enables the simultaneous efficient boarding of both preferential treatment passengers and economy passengers.

It is yet another object of the present invention to provide an aircraft passenger boarding system that enables the simultaneous efficient boarding of both preferential treatment passengers and economy passengers and effectively uses interior airport terminal gate space to organize and facilitate passenger organization and boarding through multiple aircraft doors.

It is yet a further object of the present invention to provide an aircraft passenger boarding system that enables an airline to expand or reduce aircraft capacity and servicing for at least two distinct classes of passengers in response to passenger demand and to provide different passenger boarding experiences for each class of passengers.

In accordance with the aforesaid objects, an aircraft passenger boarding system is provided that permits an airline to take advantage of improvements in aircraft terminal gate traffic and parking possible when an aircraft is equipped with one or more drive wheel drive systems including non-engine drive means that permit an aircraft to be driven by a pilot in a forward direction into and out of a gate or parking location without the use of aircraft main engines to park in an orientation that enables connection of at least a forward door and an aft door on a terminal-facing side of the aircraft to the terminal, preferably through passenger loading bridges for passenger movement into the aircraft. An aircraft may park with its longest axis completely parallel to the terminal, or an aircraft may park with its longest axis at an optimal boarding angle relative to the terminal; both orientations allow connection of a separate passenger loading bridge or loading bridge passageway directly to each forward and aft door. The front portion of the aircraft is designated for passengers who have paid for or otherwise receive preferential treatment, which may take a range of forms from wider seats and complimentary food and drink to the seats that convert to beds common in some preferential class areas in international flights. These preferential treatment passengers may use the passenger loading bridge connected to the aircraft forward door and board only through the forward door. Passengers may be assigned specific seats in the preferential section. The rear portion of the aircraft may be designated for economy passengers, who use the passenger loading bridge connected to the aircraft rear door and board only through the aft or rear door. The economy passengers would not be assigned seats, but would choose seats after boarding. Depending on the relative numbers of preferential treatment passengers and economy passengers purchasing tickets, an airline may allocate more or less of the interior of the aircraft for each class of passenger. The interior gate space may additionally be used to organize passengers as required to board through a forward door or through an aft door.

Other objects and advantages will be apparent from the following description, claims, and drawings.

DESCRIPTION OF THE INVENTION

Figure 1:
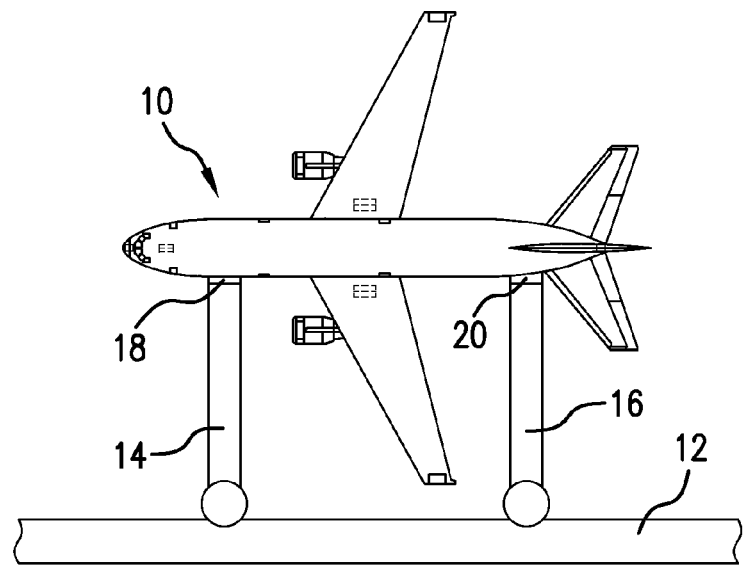
FIG. 1 is a diagram of an aircraft equipped with a drive wheel drive system powered by a non-engine drive means parked at an airport terminal with the aircraft longest axis oriented parallel to the aircraft terminal and connected to the airport terminal by a front passenger loading bridge and a rear passenger loading bridge to provide simultaneous passenger access to an aircraft forward door and to an aircraft aft door.

As noted above, aircraft passenger boarding methods and systems date back to the beginning of commercial flight. The search for more efficient passenger boarding methods and systems has intensified as some aspects of air travel have become more complicated in recent years and passenger dissatisfaction has grown. Many, if not most, passengers want to travel at the lowest cost possible, but also want a travel experience that is not accompanied by frustration and delay. Those passengers who pay more for their travel or who demonstrate their loyalty to an airline by flying on that airline with a certain level of frequency have expected, and most airlines have provided, a flying experience that is different from those passengers who are flying economy. One of the areas in which airlines have not been able to provide a better travel experience for their first class and frequent flyer passengers is the boarding process. Although passengers who receive preferential treatment have been able to board before other passengers, sit closest to the entry door, and may even receive drinks or snacks before economy passengers board, few preferential treatment passengers have been able to relax and enjoy their preferential status while a queue of economy passengers and baggage fills the aisle as they waiting to reach their seats and stow their carry-on bags. Until the present aircraft passenger boarding system, airlines have not been able to provide a boarding process for each group of passengers that satisfies the needs of each group, nor have airlines been able to provide separate gate areas or separate boarding doors for different groups of passengers. The present boarding system permits economy passengers to board an aircraft quickly and efficiently from a rear aircraft door while allowing the early or simultaneous boarding of preferential treatment passengers through a separate forward door in a manner than maintains the preferential treatment these passengers expect.

The present aircraft passenger boarding system may be instituted by airlines who have equipped their aircraft with drive wheel drive systems powered by non-engine drive means controllable by aircraft pilots to move the aircraft during ground travel without operation of aircraft main engines and to maneuver into and out of airport ramp and gate areas in a forward direction to park in selected orientations that permit a direct connection between the terminal and at least a forward aircraft door and a rear aircraft door on one side of the aircraft for passenger transfer between the terminal and the aircraft. At most airports, particularly large airports, connections between aircraft and the terminal will be provided by passenger loading bridges or jet bridges that enable passengers to move between the terminal and the aircraft in a protected environment. At some smaller airports or in the event that a loading bridge is not available, aircraft stairs or portable stairs may be used to provide passenger access to a forward and an aft door on one side of an aircraft or even to forward doors and aft doors on both sides of the aircraft for expanded passenger access. The present passenger boarding system will be discussed primarily with respect to the use of loading bridges or jet bridges, but it is also suitable for use with passenger access stairs to improve the efficiency of the boarding process in airports that rely on stairs for passenger egress and ingress from aircraft. It is contemplated that a combination of stairs and loading bridges may also be used to improve the efficiency of passenger boarding.

The inventors of the present invention recognized that significant efficiencies in airport gate operations are possible when an aircraft is parked parallel to a terminal. These efficiencies are described in co-pending International Patent Application No. PCT/US13/72508, filed Nov. 29, 2013, entitled Airport Terminal Aircraft Gate Traffic Management System, the disclosure of which is fully incorporated herein by reference. Additional efficiencies that may be achieved when an aircraft is parked parallel to a terminal are further described in commonly owned co-pending application Ser. No. 14/326,281, filed Jul. 8, 2014, entitled System and Method for Improving Efficiency of Aircraft Gate Services and Turnaround, the disclosure of which is fully incorporated herein by reference. Since not all airports may have the capability to accommodate aircraft parked parallel to a terminal, the inventors of the present invention have also described an aircraft parking orientation that is particularly useful at airports where gate parking spaces are limited by safety margins defined for narrow body aircraft, for example Boeing 737-800 and similarly sized aircraft, with minimal or no changes to gates at these airports. Direct passenger access to aircraft doors rear of the aircraft wing may be achieved with or without structural modifications to an aircraft gate parking area and without use of over-the-wing types of jet bridges, which have proved problematic.

The reduced turnaround time and significant increase in efficiency of airport gate operations possible with the system and methods described in the aforementioned patent applications require that an aircraft be equipped with one or more drive wheel drive systems mounted within one or more aircraft nose landing gear wheels, main landing gear wheels, or a combination of both nose and main landing gear wheels to move the aircraft autonomously on a ground surface without reliance on aircraft main engines or tow vehicles. To achieve maximum efficiency of airport gate operations and to minimize aircraft turnaround time, aircraft are equipped with an engines-off taxi system, most preferably an electric taxi system. In a preferred type of engines-off electric taxi system, a non-engine electric drive means is controlled to power one or more landing gear wheels to rotate and to move the aircraft autonomously on the ground without reliance on aircraft main engines. A preferred drive wheel drive system employs a pilot-controlled drive system with a non-engine electric drive means actuatable to drive both nose landing gear wheels at a desired torque and speed capable of moving a commercial aircraft autonomously on a ground surface.

A preferred non-engine electric drive means for engines-off taxi is an electric drive motor assembly, preferably powered by an aircraft's auxiliary power unit, that is capable of operating at a torque and speed required to move an aircraft landing gear wheel and, therefore, to move an aircraft autonomously on the ground. A range of motor designs capable of high torque operation across a desired speed range that can move a commercial-sized aircraft wheel and function as described herein may be suitable electric drive means. Electric drive motors that may be suitable for use in an electric drive motor assembly mounted within an aircraft landing gear drive wheel that are controlled by a pilot to drive an aircraft to park in an orientation where the present passenger boarding system may be effectively employed have been proposed. For example, an inside-out electric motor in which the rotor can be internal to or external to the stator, such as that shown and described in U.S. Patent Application Publication No. 2006/0273686, the disclosure of which is incorporated herein by reference, may be suitable. A high phase order electric motor of the type described in, for example, U.S. Pat. Nos. 6,657,334; 6,838,791; 7,116,019; and 7,469,858, the disclosures of the aforementioned patents being incorporated herein by reference, may also be effectively used as a non-engine electric drive motor for engines-off taxi to drive an aircraft into and out of a selected parking orientation in accordance with the present system and method. The foregoing are intended to be exemplary of electric drive means that may be used in connection with the present passenger boarding system, and are not intended to be limiting.

Although it is not a preferred method of parking an aircraft, it is also contemplated that aircraft may be moved by external vehicles, such as tugs, tow vehicles, aircraft-moving transfer modules, and the like, into one of the parking orientations shown and described herein to enable aircraft passengers on aircraft that are not equipped with drive wheel drive systems for autonomous ground movement. The use of external vehicles, although not ideal for parking an aircraft as shown and described herein, at least eliminates the risks and dangers associated with operation of an aircraft's main engines within an airport ramp and gate area.

Referring to the drawings, which are schematic and not drawn to scale, FIG. 1 illustrates an aircraft 10 parked at an aircraft terminal 12 in an orientation with the longest axis of the aircraft parallel to the terminal building. The aircraft may be driven into this parking position by a pilot controlling a drive wheel drive system with an electric drive motor to move the aircraft toward the terminal in a nose-in direction and then to turn the aircraft so that it may be parked parallel to the terminal, as described in International Patent Application No. PCT/US13/72508, referred to above. The aircraft is driven in only a forward direction into and out of an assigned terminal parking location. Two retractable or collapsible passenger loading bridges 14 and 16 may be located as shown to extend to and connect with each of the aircraft's forward door 18 and aft door 20 on the side of the aircraft facing the terminal 12 so that the loading bridges 14 and 16 are essentially parallel to each other. After all of the passengers have boarded the aircraft in accordance with the boarding process described herein and the aircraft 10 is cleared for departure, the loading bridges 14 and 16 will be retracted away from the aircraft, and the pilot may control operation of the electric drive motor in the drive wheel drive system to move the aircraft forward to turn and drive away from the terminal to a takeoff runway.

Figure 2:
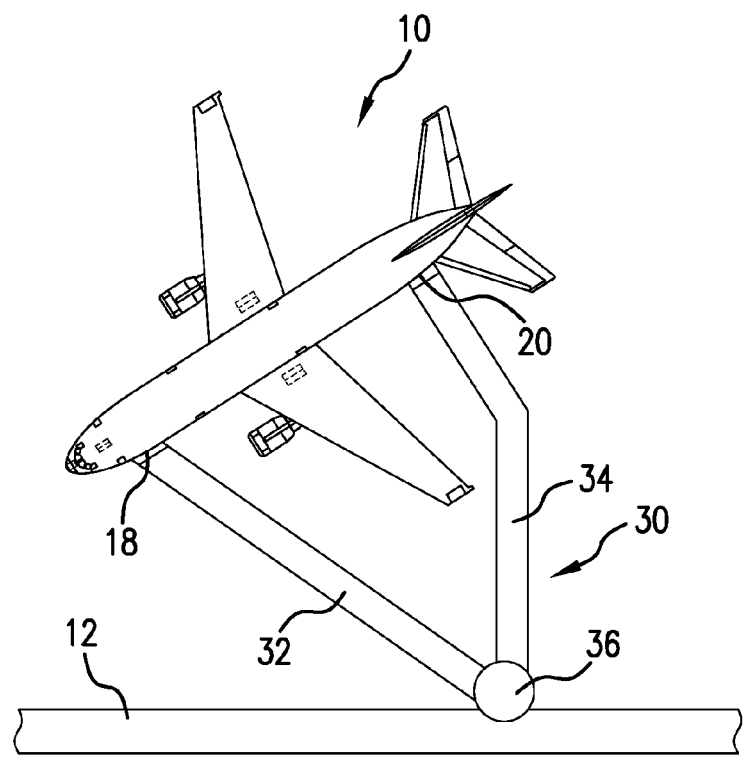
FIG. 2 is a diagram of an aircraft equipped with a drive wheel drive system powered by a non-engine drive means parked at an airport terminal with the aircraft longest axis oriented at an optimal boarding angle relative to the aircraft terminal and connected directly to the airport terminal by a front passenger loading bridge and a rear passenger loading bridge to provide simultaneous passenger access to an aircraft forward door and to an aircraft aft door.

Since the parallel parking location shown in FIG. 1 may require more space and/or loading bridges or loading bridge configurations that may not be available at some airports, an alternative parking orientation that permits a different loading bridge configuration which still provides separate passageways to each forward and aft door on a terminal-facing side of an aircraft is shown in FIG. 2. In the FIG. 2 parking orientation, an aircraft 10 approaches the terminal 12 in a nose-in forward direction and then turns to park at an optimal boarding angle relative to the terminal 12 that facilitates the connection of a loading bridge 30 with dual passageway sections 32 and 34 as shown. This particular loading bridge arrangement may have a single connection location 36 that connects with a terminal gate, but may extend as required to direct passengers to either a forward aircraft door 18 or to an aft aircraft door 20. This type of passenger loading bridge is already in use at some European airports. Alternatively, in airports not equipped with the dual passageway loading bridge shown, two separate passenger loading bridges may also be employed to connect simultaneously to the aircraft front and aft doors when an aircraft is parked at the optimal boarding angle shown in FIG. 2. After all passengers have boarded and the aircraft is cleared for departure, the loading bridge passageway sections 32 and 34 are retracted or moved away, and the aircraft pilot controls operation of the non-engine drive means in the drive wheel drive system to move the aircraft 10 in a forward direction away from the terminal 12 to travel to a takeoff runway.

An optimum parking orientation and/or an optimal boarding angle described herein is an aircraft parking orientation relative to an airport terminal and/or gate and loading bridge locations that positions an aircraft in a location and at an angle relative to an airport terminal where maximum use may be made during passenger boarding and deplaning of the aircraft's doors, especially the aircraft's doors that are located behind or rear of the wing, and where loading bridges may be quickly and efficiently moved around and behind the wing, without being moved over or on top of the wing, to align with and connect to doors rear of the wing As discussed above, preferential treatment passengers may be directed to board the aircraft through one of the loading bridges 14 or 16 of FIG. 1 or one of the loading bridge passageways 32 or 34 of FIG. 2, and economy passengers are directed to board the aircraft through the other loading bridge or loading bridge passageway not used by preferential treatment passengers. With the present passenger boarding system, preferential treatment passengers will typically be directed to board through the loading bridge 14 or loading bridge passageway 32 connected to the aircraft forward door 18. This part of the aircraft interior is likely to be outfitted with the wider seats and/or seats that convert to beds, which such passengers may expect. Economy passengers will then be directed to board through the loading bridge 16 or the loading bridge passageway 34 that connects to the aft or rear aircraft door 20. Since the type of loading bridge 30 shown in FIG. 2 has a single entrance 36 from the terminal 12 to the two loading bridge passageways 32 and 34, preferential treatment passengers may be directed to board first, and then economy passengers may be directed to board after the preferential treatment passengers have boarded. Alternatively, both groups of passengers may be directed to board simultaneously, and the groups may then be separated as individual passengers are directed according to their status, so that preferential treatment passengers follow a respective loading bridge passageway 32 to the forward door 18, and economy passengers are directed to the aft door 20.

Figure 3A:
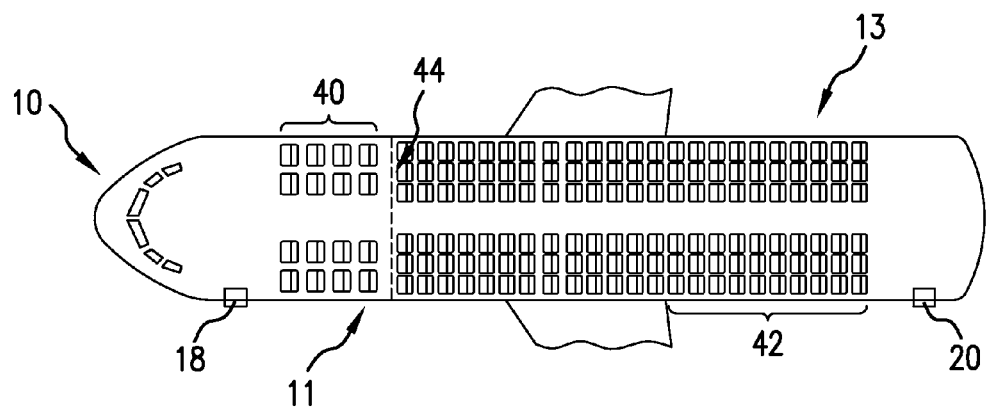
FIG. 3A is a schematic diagram of an aircraft interior showing passenger access to the aircraft interior through both forward and aft doors and flexibly defined preferential passenger and economy passenger areas.
Figure 3B:
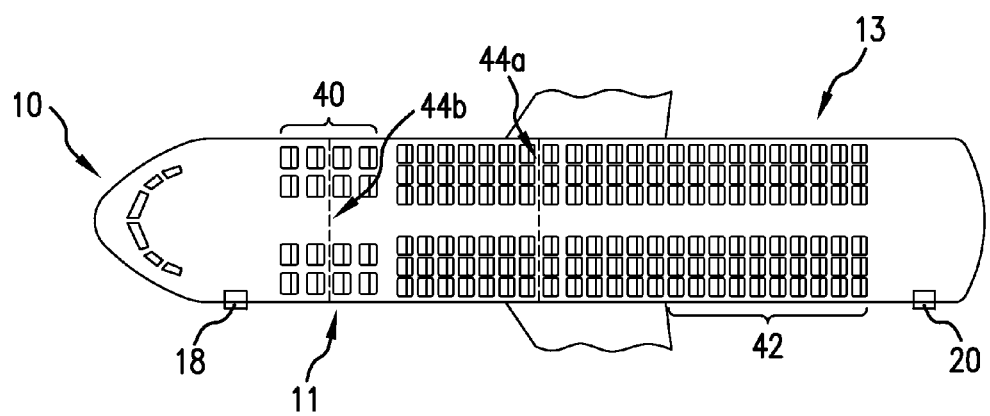
FIG. 3B is a schematic diagram of an aircraft interior showing passenger access to the aircraft interior through both forward and aft doors showing how the flexibly defined preferential passenger and economy passenger areas of FIG. 3a may be changed.

The relative numbers of preferential treatment passengers and economy passengers may vary for a flight, with the result that there are fewer or more in each group of passengers than the number of seats generally made available for each group. FIGS. 3A and 3B illustrate one way in which an airline may flexibly adjust sections of an aircraft to accommodate fluctuating numbers of preferential treatment passengers and economy passengers. In the interior diagrams of aircraft 10 shown in FIGS. 3A and 3B, the rows of seats 40 at the forward end 11 of the aircraft that are near the cockpit are wider and there are fewer seats in each row than there are in the rows of seats 42 toward the rear 13 of the aircraft. This forward section 11 will generally be limited to the preferential treatment passengers who will board through the front door 18. The remaining rear section 13 of the aircraft will be available for the economy passengers who board through the aft door 20. As indicated above, preferential treatment passengers may have specific seats, which they may request, if desired. Since this group will usually be smaller than the economy passenger group, the time required for passengers to find their seats and stow any carry-on bags should be relatively short. The economy passenger group, boarding through the aft door 20, will not have assigned seats, but may be boarded on a first come, first served basis or on a similar approach that may efficiently accommodate seating these passengers. Once inside the aircraft, the passengers in the economy group will sort themselves into seats and put carry-on bags away. Low cost carriers' experience with this type of system has demonstrated that it tends to be the quickest way to board a large group of passengers. Dashed line 44 in FIG. 3A indicates where the preferential treatment passenger section ends and the economy passenger section begins for passengers on the flight represented by FIG. 3A. An additional feature (not shown), presently found in an Airbus A320 aircraft, that may be incorporated into an aircraft interior to further distinguish passenger groups and speed aircraft turnaround is a variable aisle width. A wider "fast turnaround" aisle created by narrower seats could be provided for the economy passenger section of an aircraft, while a slightly narrower aisle could be provided for the preferential passenger section.

Unlike current boarding processes that use only one door for entry of all passengers onto the aircraft so that economy passengers must pass through the preferential passenger section, the passenger boarding system of the present invention keeps each group of passengers separate in their respective sections of the aircraft. Consequently, an airline may be able to operate a portion of the aircraft as a low cost carrier and a portion of the aircraft as a premium aircraft. The dashed line 44 separating the two aircraft sections may be indicated by a movable barrier, such as a curtain, a screen, or the like. Alternatively, or in addition, a flight attendant may be stationed at the point separating the two groups of passengers to ensure that economy passengers do not occupy preferential treatment seats or vice versa.

FIG. 3B illustrates a situation in which the airline has more preferential treatment passengers than economy passengers. In this case, the dashed line 44a, representing the separation between the two sections of the aircraft must be moved toward the rear as shown to accommodate the increased number of preferential treatment passengers. Since most aircraft seats have removable armrests, they may be removed to provide more spacious seating for these passengers. A movable curtain, screen, or other barrier, if used, may be designed to mark the separation of the two groups of passengers more definitively. It may be helpful also to have a flight attendant mark the division between sections. Alternatively, if the number of economy passengers on a flight is greater than the number of seats allotted to this group, the dashed line 44b, representing the division between economy and preferential treatment passengers and, if used, a movable barrier may be moved forward as required to accommodate the greater number of economy passengers, some of whom will occupy the wider seats normally provided for preferential treatment passengers.

It is contemplated that the present passenger boarding system may be adapted for use in boarding different groups or classes of passengers on aircraft that have different interior configurations or arrangements than that shown in FIGS. 3A and 3B. For example, an aircraft may have more than a single aisle, or preferential treatment passengers may have seating areas that convert to reclining lounges or beds. The present passenger boarding system is sufficiently flexible to accommodate a range of aircraft interior configurations and arrangements.

To further speed the boarding of economy passengers, as well as to accord preferential treatment passengers an additional benefit, an airline may impose specific limits on carry-on baggage for economy passengers, but not limit carry-on baggage for preferential treatment passengers. During flight, food and/or beverage service may also be different for each group of passengers, for example following current practice where economy passengers are required to pay for drinks and snacks, while beverages and food are complimentary for preferential treatment passengers. Depending on the length of the flight, other distinctions between services offered to each group of passengers by an airline may also be made.

The passenger boarding system of the present invention allows an airline that is a legacy carrier to also function as a low cost carrier on the same flight, with the first class or other preferential treatment passengers entering only through a forward door and occupying a designated forward section of the aircraft and the economy passengers entering only through an aft door and occupying a designated rear section of the aircraft. Additionally, as noted above, each flight may have a greater or lesser number of each type of passenger, depending on passenger demand for that particular flight, with the result that a flight may be primarily or even totally filled with economy or preferential treatment passengers so that the airline has the flexibility to operate each flight according to the passenger group ratio. An airline could even extend the concept to the branding used for each class of passengers and offer tickets under one name for preferential treatment passengers who board expecting premium, or at least legacy airline level, in-flight treatment, and under a different name for economy passengers who board expecting a low cost carrier in-flight treatment. This might be similar to United Airlines using the name "United" for its premium or legacy carrier passenger services and the name "Ted" for its economy passenger services and branding the tickets and other items and services accordingly.

The present aircraft passenger boarding system further contemplates separating passengers into preferential treatment and economy groups inside an airport terminal gate area to improve boarding efficiency. When an aircraft is parked in the parallel orientation shown in FIG. 1, passenger loading bridges are attached to separate terminal access doors, which may require the use of adjacent terminal gates. If, for example, a passenger loading bridge connected to a forward aircraft door is the loading bridge connected to Gate B28 and a passenger loading bridge connected to a rear aircraft door is the loading bridge connected to Gate B30, adjacent to Gate B28, preferential treatment passengers would be directed to Gate B28 and economy passengers would be directed to Gate B30 for boarding. An aircraft parked at an angle that permits the connection of the type of passenger loading bridge shown in FIG. 2 to an aircraft's forward and aft doors may not require separate gates. The two groups of passengers could check in and wait at separate lounge areas inside the terminal near the gate and board as described above in connection with FIG. 2. The extent of passenger class separation inside an airport terminal could also be accomplished in a range of other ways that may be varied to accommodate interior and exterior airport gate configurations. Variations from the system and method described above that achieve the same purpose are contemplated to be within the scope of the present passenger boarding system. The only common factor to be considered is that all passengers will arrive at the flight's destination at the same time. When the aircraft reaches its destination, the pilot will control the engines-off drive wheel assembly to drive the aircraft to the destination airport terminal and park the aircraft in an optimum parking orientation or at an optimal boarding angle as described above so that passenger loading bridges may be connected to forward and aft aircraft doors. It is contemplated that each group of passengers will be directed to exit the aircraft through the forward or aft door used to board the aircraft.

The present aircraft passenger boarding system has been described with respect to using a front section of an aircraft for preferential treatment passengers and a rear section of an aircraft for economy passengers. On some aircraft, however, it may be desirable to reverse this arrangement and have preferential treatment passengers board through an aft aircraft door and occupy a rear section of the aircraft, while economy passengers board through a forward door and occupy a front section of the aircraft. Further, while the aircraft parking orientations shown and described herein are directed to use of only a forward aircraft door and an aft aircraft door, some aircraft may have a central door that is accessible for boarding passengers through a loading bridge, and it is contemplated that an available additional door may also be used for either of the classes of passengers discussed or for an additional class of passengers.

While the present invention has been described with respect to preferred embodiments, this is not intended to be limiting, and other equivalent arrangements, structures, and processes that perform the required functions are contemplated to be within the scope of the present invention.

INDUSTRIAL APPLICABILITY

The aircraft passenger boarding system of the present invention will find its primary applicability in aircraft equipped for autonomous ground movement with one or more drive wheel drive systems including pilot-controllable non-engine drive means controlled by the aircraft pilot to drive the aircraft in a forward direction into and out of an optimum parking orientation at an airport terminal that enables passenger transfer connection between at least a forward and a rear aircraft door on a terminal-facing side of the aircraft so that separate passenger loading bridges or separate loading bridge passageways may be provided for selected defined class of passengers boarding and traveling on the aircraft.

The invention claimed is:

1. An aircraft passenger transfer method for efficiently transferring passengers between an aircraft equipped to drive autonomously into and out of airport terminal parking locations and an airport terminal interior, comprising
   a. providing an aircraft equipped with at least a forward door located toward a nose end of the aircraft and an aft door located rear of a wing of the aircraft on a side of the aircraft and with one or more pilot-controllable drive wheel drive systems, each comprising non-engine electric drive means for driving the aircraft autonomously into and out of airport terminal parking locations;
   b. at an airport terminal parking location, providing at least two extendible and retractable loading bridges connected to the airport terminal at the airport terminal parking location to provide a direct passenger transfer connection between the airport terminal and the forward and aft doors of the aircraft;
   c. controlling the drive wheel drive systems to drive the aircraft in a forward direction into and out of the airport terminal parking locations and parking the aircraft in a parking orientation with a longest axis of the aircraft parallel to or at an angle relative to the airport terminal selected to directly connect the at least two extendible and retractable loading bridges provided at the airport terminal parking location to both the forward and aft doors when the aircraft is parked in the airport terminal parking location;
   d. extending one of the at least two extendible and retractable loading bridges to connect with the forward door and provide a first direct passenger transfer connection between an interior of the airport terminal and the forward door, and extending another of the at least two extendible and retractable loading bridges to connect with the aft door and provide a second direct passenger transfer connection with the aft door;
   e. designating a first interior section of the aircraft for seating of a defined first class of passengers and a forward or aft door of the aircraft accessing the first interior section for transferring the defined first class of passengers, and designating a second interior section of the aircraft separate from the first interior section for seating a defined second class of passengers and a forward or aft door of the aircraft accessing the second interior section for transferring the defined second class of passengers; and
   f. directing the defined first class of passengers to transfer between the airport terminal and the aircraft using only a loading bridge directly connected with the forward or aft door accessing the first interior section and simultaneously or separately directing the defined second class of passengers to transfer between the terminal and the aircraft using only a loading bridge directly connected with the forward or aft door accessing the second interior section.

2. The method of claim 1, further comprising providing a flexibly movable barrier to separate said first interior section from said second interior section and moving the flexibly movable barrier to change relative numbers of seats in and size of the first interior section and the second interior section as required by numbers of passengers in the defined first class of passengers and numbers of passengers in the defined second class of passengers.

3. The method of claim 2, further comprising identifying said defined first class of passengers as preferential treatment passengers and said defined second class of passengers as economy passengers, designating a front section of said aircraft accessed by said forward door as said first interior section and a rear section of said aircraft accessed by said aft door as said second interior section, and moving the flexibly movable barrier to a location that separates the first and second interior sections and accommodates the defined first class of passengers in the first interior section and the defined second class of passengers in the second interior section.

4. The method of claim 3, further comprising providing interior airport terminal space adjacent to said at least two extendible and retractable loading bridges; separating said defined first class of passengers from said defined second class of passengers in said interior airport terminal space prior to boarding said aircraft; and boarding said aircraft by directing said defined first class of passengers to enter said aircraft first interior section through the loading bridge directly connected with the forward door accessing the first interior section and directing said defined second class of passengers to enter said aircraft second interior section through the loading bridge directly connected with the aft door accessing the second interior section.

5. The method of claim 1, further comprising identifying said defined first class of passengers as preferential treatment passengers, and designating the interior section of said aircraft accessed by said forward door as said first interior section of said aircraft and transferring the defined first class of passengers only through the loading bridge connecting the forward door and the airport terminal.

6. The method of claim 1, further comprising identifying said defined second class of passengers as economy passengers, and designating the interior section of said aircraft accessed by said aft door as said second interior section of said aircraft and transferring the defined second class of passengers only through the loading bridge connecting the aft door and the airport terminal.

7. The method of claim 1, further comprising identifying said defined first class of passengers as preferential treatment passengers, and designating the interior section of said aircraft accessed by said aft door as said first interior section of said aircraft.

8. The method of claim 1, further comprising identifying said defined second class of passengers as economy passengers, and designating the interior section of said aircraft accessed by said forward door as said second interior section of said aircraft.

9. The method of claim 1, further comprising driving said aircraft in a forward direction and parking in the orientation parallel to said airport terminal and extending a first of the at least two loading bridges to connect with said forward door, and extending a separate second of the at least two loading bridges is to connect with said aft door and transferring the defined first class of passengers through the first loading bridge and the defined second class of passengers through the second loading bridge.

10. The method of claim 9, further comprising directing said defined first class of passenger to board said aircraft only through said first loading bridge and said defined second class of passengers only through said second loading bridge.

11. The method of claim 1, further comprising driving said aircraft in a forward direction and parking in the orientation with the aircraft angled at an optimal passenger transfer angle relative to said airport terminal selected to directly connect one of the at least two extendible and retractable loading bridges when extended with said forward door, and a second of the at least two extendible and retractable loading bridges when extended with said aft door without extending over a terminal-facing wing of said aircraft and transferring the defined first class of passengers through the first loading bridge and the defined second class of passengers through the second loading bridge.

12. The method of claim 11, further comprising directing said defined first class of passenger to board said aircraft only through said first loading bridge and said defined second class of passengers to board said aircraft only through said second loading bridge.

13. The method of claim 1, further comprising providing interior airport terminal space adjacent to said at least two extendible and retractable loading bridges; designating a first loading bridge for connection to said forward door and a second loading bridge for connection to said aft door; identifying said defined first class of passengers as preferential treatment passengers and said defined second class of passengers as economy passengers; designating a front section of said aircraft accessed by said forward door as said first interior section and a rear section of said aircraft accessed by said aft door as said second interior section; separating said defined first class of passengers from said defined second class of passengers within said interior airport terminal space prior to boarding said aircraft; and boarding said aircraft by directing said defined first class of passengers to enter said aircraft front section through said first loading bridge and directing said defined second class of passengers to enter said aircraft rear section through said second passenger loading bridge.

14. The method of claim 13, further comprising assigning specific seat locations in said first interior section to said defined first class of passengers and directing each of said defined first class of passengers to said specific seat locations.

15. The method of claim 13, further comprising directing said defined second class of passengers to said second interior section without assigning specific seat locations in said second interior section to said defined second class of passengers.

16. The method of claim 1, further comprising simultaneously transferring the defined first class of passengers and the defined second class of passengers between the airport terminal and the aircraft and between the aircraft and the airport terminal.

* * * * *